(12) United States Patent
Adenot et al.

(10) Patent No.: US 9,163,733 B2
(45) Date of Patent: Oct. 20, 2015

(54) FLUID VALVE

(75) Inventors: Sébastien Adenot, Pontoise (FR);
Grégory Hodebourg, Sartrouville (FR)

(73) Assignee: Valeo Systemes de Controle Moteur,
Cergy Saint Christophe (FR)

( * ) Notice: Subject to any disclaimer, the term of this patent is extended or adjusted under 35 U.S.C. 154(b) by 0 days.

(21) Appl. No.: 13/805,006

(22) PCT Filed: Jun. 27, 2011

(86) PCT No.: PCT/FR2011/051489
§ 371 (c)(1),
(2), (4) Date: Mar. 1, 2013

(87) PCT Pub. No.: WO2012/001286
PCT Pub. Date: Jan. 5, 2012

(65) Prior Publication Data
US 2013/0153803 A1   Jun. 20, 2013

(30) Foreign Application Priority Data

Jun. 30, 2010 (FR) .................................... 10 02781

(51) Int. Cl.
F16K 1/22 (2006.01)
F02D 9/10 (2006.01)
F02M 25/07 (2006.01)
F16K 1/226 (2006.01)
F16K 27/02 (2006.01)

(52) U.S. Cl.
CPC ............... *F16K 1/22* (2013.01); *F02D 9/1015* (2013.01); *F02M 25/0793* (2013.01); *F16K 1/2263* (2013.01); *F16K 27/0218* (2013.01); *F02D 9/106* (2013.01); *Y02T 10/121* (2013.01)

(58) Field of Classification Search
CPC ....... F16K 27/0218; F16K 1/22; F16K 1/226; F16K 1/2263; F02D 9/106; F02D 9/101; F02D 9/1015; F02D 9/1025; F02D 9/1005; F02M 25/0793; Y02T 10/121
USPC .......................... 251/304–308; 123/336, 337
See application file for complete search history.

(56) References Cited

U.S. PATENT DOCUMENTS

| 813,771 A * | 2/1906 | Bush .............................. 251/112 |
| 1,034,531 A * | 8/1912 | Stump ........................... 116/138 |
| 2,815,173 A * | 12/1957 | Drapeau et al. .................. 236/34 |
| 2,815,924 A * | 12/1957 | Burch ........................... 251/305 |
| 3,666,236 A * | 5/1972 | Gachot ......................... 251/306 |

(Continued)

FOREIGN PATENT DOCUMENTS

| DE | 9300783 | * | 5/1994 |
| DE | 199 36 457 A1 | | 2/2001 |
| WO | WO 2012030222 A1 | * | 3/2012 |

OTHER PUBLICATIONS

International Search Report w/translation from PCT/FR2011/051489 mailed on Oct. 17, 2011 (4 pages).

*Primary Examiner* — Marina Tietjen
(74) *Attorney, Agent, or Firm* — Osha Liang LLP

(57) ABSTRACT

The invention relates to a fluid valve comprising: a body (50) defining a fluid flow duct (60), and a flap (1) that can move between a closed position preventing the fluid from flowing through the duct and an open position allowing the fluid to flow through the duct. According to the invention, the valve also comprises a joint (2) having at least one opening for the passage of the fluid, and the aforementioned flap can close the opening(s) (5) in the joint when in the closed position.

11 Claims, 2 Drawing Sheets

(56) References Cited

U.S. PATENT DOCUMENTS

Figure 1:
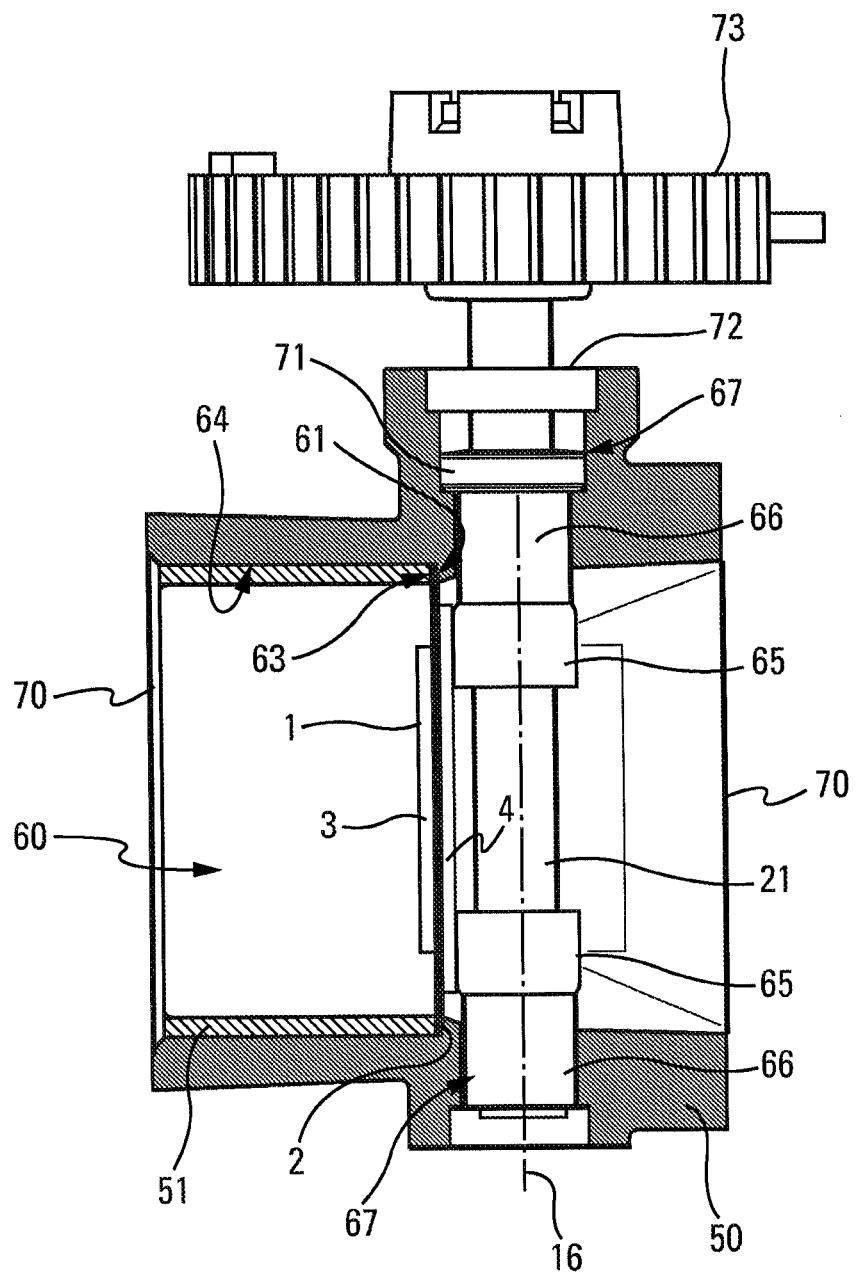

| | | |
|---|---|---|
| 4,249,555 A | 2/1981 | Scaramucci |
| 4,301,833 A * | 11/1981 | Donald, III ................... 137/521 |
| 4,519,579 A | 5/1985 | Brestel et al. |
| 4,840,114 A * | 6/1989 | Bauer et al. .................... 454/143 |
| 5,979,870 A * | 11/1999 | Junier ........................... 251/305 |
| 6,338,468 B1 * | 1/2002 | Ogawa et al. ................. 251/305 |
| 2004/0004204 A1 | 1/2004 | Wang |
| 2010/0148107 A1 * | 6/2010 | Keller-Staub ................ 251/306 |

* cited by examiner

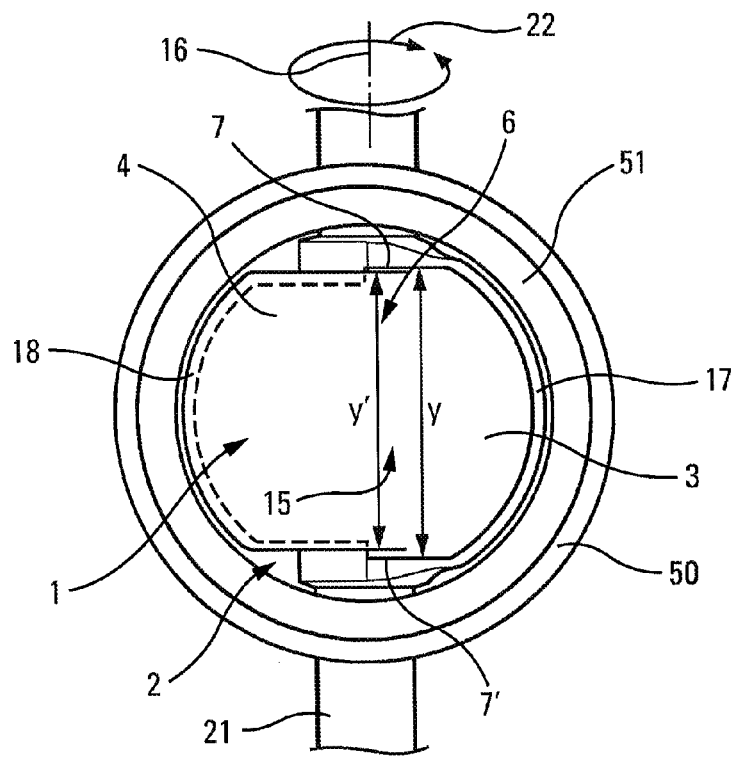
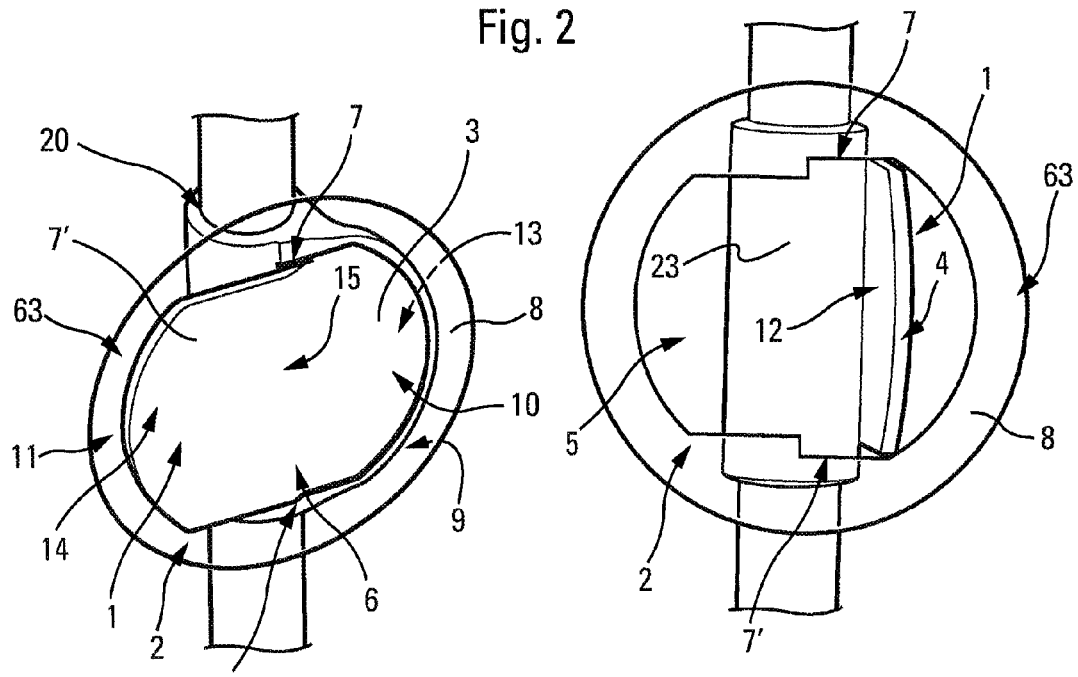
Fig. 2
Fig. 3          Fig. 4

FLUID VALVE

The present invention relates to a valve for the circulation of fluid. This fluid may notably be exhaust gas from a motor vehicle engine, fresh air bound for the intake side of the engine or a mixture of fresh air and exhaust gases.

Said valve may also be used as a metering valve by being sited along the air intake line or the exhaust gas recirculation line between the exhaust and the intake of an engine.

Valves comprising a body, defining a fluid flow duct, and a flap, able to move between a closed position that prevents the circulation of fluid in the duct and an open position that allows fluid to circulate in the duct, are known at the present time.

One difficulty to be managed with this type of valve is that of obtaining satisfactory fluidtightness when the flap is in the closed position. This is because the tolerated leakage flow rates may be very small. Numerous solutions have already been proposed.

Thus, it is known practice to create complex bearing surfaces for the flap on the interior wall of the duct. It is also known practice to fit the flap with a peripheral seal or to machine the edge of the flap in such a way as to improve contact with the interior wall of the duct.

Another difficulty relates to the power that has to be applied to the flap in order to move it away from its closed position. In order to reduce the energy consumption of the valve, this power needs to remain limited, whereas the solutions implemented to improve sealing generate friction which has the impact of increasing the power required.

The present invention seeks to improve the situation and to this end proposes a fluid circulation valve comprising a body defining a fluid flow duct, and a flap able to move between a closed position, preventing circulation of the fluid in the duct, and an open position, allowing the fluid to circulate in the duct.

According to the invention, said valve comprises a seal having at least one opening for the passage of the fluid, said flap being designed to be able to close said opening or openings in the seal when it is in the closed position. By interposing a seal it is thus possible to improve sealing while at the same time keeping control over the amount of friction created.

According to various embodiments:
said seal is fixed in a fluidtight manner to the valve body and is positioned transversely, notably orthogonally, to said duct,
said flap is equipped with a first wing and with a second wing, said wings being provided one on either side of the seal when the flap is in the closed position, said flap comprising an intermediate zone, connecting said first wing and said second wing, that passes through said opening in the seal,
said seal comprises a planar zone having a surface against which said first wing comes to bear via one of its faces, designed to be planar and referred to as the bearing face of said first wing, and an opposite surface against which the second wing of the flap comes to bear, via one of its faces, designed to be planar and referred to as the bearing face of the second wing, when the flap is in the closed position, said opening for the passage of the fluid provided in the seal being positioned in the region of said planar zone,
said bearing surface of the first wing and said bearing surface of the second wing of the flap extend in two parallel planes distant from one another,
said planes are distant by a dimension corresponding to the thickness of the seal in said planar zone,
the second wing of the flap has a surface on the opposite side to its bearing surface, which is planar, and the intermediate zone has an inclined plane between the bearing face of the first wing and said opposite face,
the axis about which the flap is articulated is provided near the intermediate zone of the flap and, in the direction of the axis about which the flap is articulated, said first wing has a dimension extending on either side beyond the dimension by which the intermediate zone extends, at least in the region of a zone of connection between said intermediate zone and said first wing,
said opening in the seal extends facing said wings when the flap is in the closed position,
the seal is held in said body by a sleeve,
said body defines a stop for said seal and said sleeve is configured to hold said seal pressed against said stop,
the stop has a planar annular surface, provided in a plane transverse, notably orthogonal, to a longitudinal axis of said duct, and said seal has a flat peripheral edge provided to press against said annular surface of the stop,
said body has a cylindrical bore able to accept said sleeve,
the sleeve is positioned on the other side of said seal with respect to an axis of articulation of the flap, which axis is off-centered with respect to said flap,
the valve comprises a drive shaft that drives the flap about an axis of articulation,
the flap comprises two bushings, able to accept said shaft,
the valve comprises at least one bearing guiding the rotation of the shaft, provided in a housing for the passage of said shaft which is formed in said body of the valve, said bearing protruding into the duct.

The invention will be better understood from studying the following description given merely by way of entirely non-limiting example and accompanied by the attached drawings in which:

FIG. 1 is a view in section, illustrating one embodiment of a valve according to the invention, the section being on a radial plane of section, FIG. 2 is a side view schematically illustrating the valve of FIG. 1, FIG. 3 is a perspective illustration of the seal and the flap of the valve of the preceding figures, depicted transparently to show hidden detail, the flap being in the closed position, FIG. 4 repeats FIG. 3, but with the flap in the open position.

As illustrated in FIG. 1, the valve according to the invention comprises a body 50 defining a fluid flow duct 60, and a flap 1 able to move between a closed position, preventing circulation of fluid in the duct, and an open position, allowing fluid to circulate in the duct. In this figure, the flap 1, viewed edge-on, is in the closed position. Said valve has one first and one second inlet/outlet orifices 70 for the fluid, these being situated on either side of the duct 60.

According to the invention, said valve further comprises a seal 2 having at least one opening 5 (visible in FIG. 4) for the passage of the fluid and said flap 1 is designed to be able to close said opening or openings 5 in the seal when it is in the closed position.

This then yields a solution that offers good sealing while at the same time limiting friction.

Said seal 2 is fixed, for example, to the body 50 of the valve, in a fluidtight manner. In particular it is positioned orthogonal to said duct 60 and said opening 5 in the seal allows fluid to pass along the duct 60 when the flap is in the open position.

For that, according to the embodiment illustrated, the seal 2 is held in said body by a sleeve 51. More specifically, said body 50 may define a stop 61 for said seal 2 and said sleeve 51 is configured to keep said seal 2 pressed against said stop 61. In other words, the seal 2 is sandwiched between the sleeve 51 and the body 50 of the valve.

In order to improve the quality of the contact, and the fluidtightness thereof, said stop 61 has a planar annular surface provided in a plane orthogonal to a longitudinal axis of said duct 60 and said seal 2 has a flat peripheral edge 63 designed to press against said annular surface of the stop 61. As expanded upon later, said seal may incidentally be flat over its entire surface.

Said body, for example, has a cylindrical bore 64 able to accept said sleeve 51, notably by force-fitting, said bore 64 and said sleeve 51 both having corresponding circular cross sections.

Said sleeve 51 notably extends between one of said inlet/outlet orifices 70 and said stop 61 and defines a first part of the fluid flow duct 60. The other part of the duct is, for example, slightly convergent from the other inlet/outlet orifice 70 toward said seal 2.

The sleeve 51 is positioned, for example, on the other side of said seal 2 with respect to an axis of articulation 16 of the flap 2, which is designed to be off-centered with respect to said flap 2.

In this regard, said valve may comprise a drive shaft 21 that drives the flap about the axis of articulation 16 and the flap 2 comprises two bushings 65, accepting said shaft 21. Said bushings 65 are, for example, made as an integral part of the remainder of the flap. They are notably diametrically opposed.

Said valve further comprises, for example, at least one bearing 66 guiding the rotation of the shaft 21, provided in a housing 67 for the passage of said shaft 21 which is formed in said body 50 of the valve. In particular, one said bearing 66 is provided on either side of the flap 1. Said bearing 66 may protrude into the duct 60, notably in order to come into contact with said bushings 65.

According to the embodiment illustrated, said valve further comprises a ball bearing 71 for articulating the shaft 21 with respect to the body 50, a return spring 72 intended to drive the flap into a failsafe position, and/or a gearwheel 73 intended to be connected to a drive motor by a system involving pinions, which have not been depicted.

As illustrated in FIGS. 2 to 4, according to the embodiment illustrated, the flap 1 is equipped, for example, with a first wing 3 and with a second wing 4. Said wings 3, 4 are provided on either side of the seal 2, when the flap 1 is in the closed position.

Said flap 1 also comprises an intermediate zone 6 connecting said first wing 3 and said second wing 4 and that passes through said opening 5 in the seal, for example in a flush manner, at zones 7, 7' of the contour of said opening 5 in the seal.

It is thus possible to achieve sealing around the opening 5 in the seal while at the same time allowing the flap to move between its open position and its closed position without the need to leave significant clearances between the opening in the seal and the contour of the flap.

Said opening 5 extends facing said wings 3, 4 when the flap is in the closed position illustrated in FIGS. 2 and 3.

When the flap is in the open position illustrated in FIG. 4, said first wing 3 and said second wing 4 extend one on either side of the seal 2, transversely thereto in order to allow the fluid to pass. The flap 1 is, for example, orthogonal to the seal 2 in its wide-open position.

According to the various embodiments illustrated, said seal 2 comprises a planar zone 8 having a surface 9 against which said first wing 3 comes to bear via one, 10, of its faces, designed to be planar and referred to as the bearing face of the first wing, and/or an opposite surface 11 against which the second wing 4 of the flap comes to bear via one, 12, of its faces, designed to be planar and referred to as the bearing face of the second wing, when the flap is in its closed position. Said fluid passage opening 5 provided in the seal 2 is positioned in the region of said planar zone 8. Sealing is thus achieved by face-to-face contact in the region of said wing or wings.

As already mentioned, said planar zone 8 may extend as far as the periphery of the seal. In other words, the seal will be completely flat.

Said bearing surface 10 of the first wing 3 and said bearing surface 12 of the second wing 4 of the flap extend, for example, in two parallel planes distant from one another, for example, by a dimension corresponding to the thickness of the seal in said planar zone 8. Contacts of the plane-to-plane type can thus be ensured.

The first wing 3 has a surface 13, on the opposite side to its bearing surface 10, and the second wing 4 has a surface 14, on the opposite side to its bearing surface 12. These two opposite faces 13, 14 are, for example, planar and the intermediate zone 6 has an inclined plane 15 between the bearing face 10 of the first wing 3 and said opposite face 14 of the second wing 4. This then encourages fluid to flow at the surface of the flap.

As already indicated, the valve may comprise an axis 16 about which the flap 1 is articulated, which axis is off-centered with respect to said flap 1 and situated, for example, near the intermediate zone 6 of the flap.

In the direction of the axis of articulation of the flap, said first wing has a dimension y extending on either side beyond the dimension y' by which the intermediate zone 6 extends, at least in the region of a zone of connection between said intermediate zone and said first wing 3. The bearing surface 10 of the first wing 3 may thus have a zone 17 of contact, in the form of an angular portion of an annulus, with the seal 2, over a first part of the periphery of the opening 5 in the seal.

According to the embodiments illustrated, the zone of contact 17 occupied by the first wing 3 also extends in line with the intermediate zone 6, in the region of the zones 7, 7'. This then enhances the fluidtightness and it is possible to have an intermediate zone 6 which does not lie flush with the contour of the opening 5 in the seal.

The opening 5 consists, for example, of two rectangles, provided side-by-side, one of the two rectangles having a dimension, along the axis of articulation of the flap, that is shorter than the other, each of said rectangles here being extended by a portion of a disk. Said second wing 4 has a rectangular shape, here extended by a portion of a disk, shutting off that part of the opening 5 that comprises the smaller rectangular part, while the first wing 3 has a rectangular shape, here extended by a portion of a disk, shutting off the part of the opening comprising the larger rectangular part. Said second wing 4 extends beyond the opening 5 so that a corresponding contact zone 18 follows the edges of the opening 5 in the seal that lie along the sides of the smaller rectangular part of the opening 5, running perpendicular to the axis of rotation, and along the disk-portion-shaped part that extends it. Said first wing 3 extends beyond the opening 5 so that the corresponding contact zone 17 follows the edges of the opening 5 that lie along the sides of the larger rectangular part of the opening 5, running perpendicular to the axis of rotation, and along the disk-shaped part that extends it. Said intermediate zone 6 is provided facing the contour of said opening 5 over part of two of the opposite sides of the larger rectangular part of which it is made. As has already been stated, the contact zone 17 of said first wing 3 is extended in line with said intermediate part 6, in the region of the zones 7, 7'.

The flap 1 has, for example, a housing 20 for the articulation shaft 21, notably produced in the form of the bushings 65 mentioned earlier. This in particular is a rotational articulation about the axis of articulation 16, as illustrated in the drawings by the arrow identified as 22.

Said housing is, for example, in an extension 23 of the intermediate zone 6, extending from the opposite face 13 to the bearing face 10 of the first wing 3 and from the bearing face 12 of the second wing 4 of the flap.

In an alternative form of embodiment corresponding to FIGS. 2 to 4, the housing 20 here is a through-housing and the shaft 21 emerges on either side of the housing 20. The shaft 21 is connected to the extension 23 in a way known per se.

The first wing 3, the second wing 4, the intermediate zone 6 and its extension 23 form, for example, a single component, notably a casting.

The first wing 3 has, for example, a larger surface area than the second wing 4. It is provided on the convergent side of the duct 60, namely on the opposite side to the side housing the sleeve 51.

The invention claimed is:

1. A fluid circulation valve comprising:
   a body defining a fluid flow duct;
   a flap able to move between a closed position, preventing circulation of the fluid in the duct, and an open position, allowing the fluid to circulate in the duct; and
   a seal having only one opening for the passage of the fluid, wherein the flap is designed to be able to close the opening in the seal when it is in the closed position,
   wherein the flap is equipped with a first wing and with a second wing, the first and second wings being provided one on either side of the seal when the flap is in the closed position, the flap comprising an intermediate zone connecting the first wing and the second wing that passes through the opening in the seal,
   wherein the seal comprises a planar zone having a first surface against which the first wing comes to bear and a second surface against which the second wing comes to bear when the flap is in the closed position, and
   wherein the first surface is substantially parallel to the second surface,
   the opening comprising smaller and larger rectangles disposed side-by-side, the smaller rectangle having a dimension that is shorter than the larger rectangle along an axis of articulation of the flap, and
   the second wing having a rectangular shape shutting off a part of the opening that comprises the smaller rectangle, the first wing having a rectangular shape shutting off a part of the opening that comprises the larger rectangle.

2. The valve as claimed in claim 1, wherein the opening extends facing the first and second wings when the flap is in the closed position.

3. The valve as claimed in claim 1, wherein the seal is held in the body by a sleeve.

4. The valve as claimed in claim 3, wherein the body defines a stop for the seal and the sleeve is configured to hold the seal pressed against the stop.

5. The valve as claimed in claim 4, wherein the stop has a planar annular surface, provided in a plane transverse to a longitudinal axis of the duct, and the seal has a flat peripheral edge provided to press against the annular surface of the stop.

6. The valve as claimed in claim 3, wherein the body has a cylindrical bore able to accept the sleeve.

7. The valve as claimed in claim 3, wherein the sleeve is positioned on the other side of the seal with respect to an axis of articulation of the flap.

8. The valve as claimed in claim 1, further comprising a drive shaft that drives the flap about an axis of articulation, and in which the flap comprises two bushings able to accept the drive shaft.

9. The valve as claimed in claim 8, further comprising at least one bearing guiding the rotation of the drive shaft, provided in a housing for the passage of the drive shaft which is formed in the body of the valve, the bearing protruding into the duct.

10. The valve as claimed in claim 1, wherein the flap further comprises an axis of articulation that is off-centered with respect to the flap.

11. The valve as claimed in claim 1, wherein the first wing and the second wing of the flap extend in two parallel planes distant from one another, and a distance between the two planes corresponds to a thickness of the seal.

\* \* \* \* \*